United States Patent
Godin et al.

(10) Patent No.: US 10,412,631 B2
(45) Date of Patent: Sep. 10, 2019

(54) BEARER OFFLOAD IN DUAL CONNECTIVITY OPERATION

(71) Applicant: Alcatel Lucent, Boulogne-Billancourt (FR)

(72) Inventors: Philippe Godin, Nozay (FR); Nicolas Drevon, Nozay (FR); Laurent Thiebaut, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 26 days.

(21) Appl. No.: 15/111,095

(22) PCT Filed: Jan. 8, 2015

(86) PCT No.: PCT/EP2015/050275
§ 371 (c)(1),
(2) Date: Jul. 12, 2016

(87) PCT Pub. No.: WO2015/104345
PCT Pub. Date: Jul. 16, 2015

(65) Prior Publication Data
US 2016/0345204 A1    Nov. 24, 2016

(30) Foreign Application Priority Data

Jan. 13, 2014 (EP) .................... 14368011

(51) Int. Cl.
*H04W 28/08* (2009.01)
*H04W 40/34* (2009.01)
*H04W 76/15* (2018.01)
*H04W 36/00* (2009.01)
(Continued)

(52) U.S. Cl.
CPC ..... *H04W 28/085* (2013.01); *H04W 36/0069* (2018.08); *H04W 40/34* (2013.01);
(Continued)

(58) Field of Classification Search
None
See application file for complete search history.

(56) References Cited

U.S. PATENT DOCUMENTS 8,831,612 B2* 9/2014 Kim ............... H04W 36/38
                                                     455/411
2013/0089076 A1* 4/2013 Olvera-Hernandez ............
                                                     H04W 36/08
                                                     370/332
(Continued)

OTHER PUBLICATIONS

Ericsson: "Signalling procedures for dual connectivity", no. San Francisco, USA; Nov. 11, 2013-Nov. 15, 2013, Nov. 13, 2013 (Nov. 13, 2013), XP050736966, Retrieved from the Internet <URL:http://www.3gpp.org/ftp/Meetings_3GPP_SYNC/RAN/RAN2/Docs/> [retrieved on Nov. 13, 2013].

(Continued)

*Primary Examiner* — Anh Ngoc M Nguyen
(74) *Attorney, Agent, or Firm* — Harness, Dickey & Pierce, P.L.C.

(57) ABSTRACT

An embodiment is a method for bearer offload from a RAN node referred to as Master RAN node such as Master eNB (MeNB) for E-UTRAN, to a RAN node referred to as Secondary RAN node such as Secondary eNB (SeNB) for E-UTRAN, in dual connectivity operation, wherein before the offload the bearer is or had been handled by the Master RAN node and involves a Local Gateway LGW collocated with the Master RAN node, the method including providing that after the offload the bearer is handled by the Secondary RAN node and involves the Local Gateway LGW collocated with the Master RAN node.

19 Claims, 4 Drawing Sheets

(51) Int. Cl.
*H04W 92/20* (2009.01)
*H04W 76/11* (2018.01)
*H04W 36/12* (2009.01)

(52) U.S. Cl.
CPC .......... *H04W 76/15* (2018.02); *H04W 36/125* (2018.08); *H04W 76/11* (2018.02); *H04W 92/20* (2013.01)

(56) References Cited

U.S. PATENT DOCUMENTS

| | | | | |
|---|---|---|---|---|
| 2014/0029579 A1* | 1/2014 | Cho | ...................... | H04W 8/082 370/331 |
| 2015/0146690 A1* | 5/2015 | Liang | .................... | H04W 36/12 370/331 |
| 2016/0105920 A1* | 4/2016 | Huang | ................. | H04W 24/02 370/328 |

OTHER PUBLICATIONS

Nsn et al: "Discussion on local IP breakout for small cell enhancement", Aug. 9, 2013 (Aug. 9, 2013), XP050718164, Retrieved from the Internet <URL:http://www.3gpp.org/ftp/tsg_ran/WG2_RL2/TSGR2_83/Docs/> [retrieved on Aug. 9, 2013].

Samsung: "Discussion on SeNB local break-out using LIPA and SIPTOLAMBDAN", no. Ljubljana, Slovenia; Oct. 7, 2013-Oct. 11, 2013, Sep. 26, 2013 (Sep. 26, 2013), XP050718812, Retrieved from the Internet <URL:http://www.3gpp.org/ftp/tsg_ran/WG2_RL2/TSGR2_83bis/Docs/> [retrieved on Sep. 26, 2013].

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release", Dec. 2, 2013 (Dec. 2, 2013), XP050733396, Retrieved from the Internet <URL:http://www.3gpp.org/ftp/Meetings_3GPP_SYNC/RAN/RAN/Docs/> [retrieved on Dec. 2, 2013]*.

Ericsson: "Overall procedures for offloading over Xn", no. Venice, Italy; Oct. 7, 2013-Oct. 19, 2013, Sep. 28, 2013 (Sep. 28, 2013), XP050720009, Retrieved from the Internet <URL:http://www.3gpp.org/ftp/tsg_ran/WG3_Iu/TSGR3_81bis/Docs/> [retrieved on Sep. 28, 2013].

International Search Report PCT/ISA/210 and Written Opinion of the International Searching Authority PCT/ISA/237 for International Application No. PCT/EP2015/050275 dated Apr. 8, 2015.

\* cited by examiner

BEARER OFFLOAD IN DUAL CONNECTIVITY OPERATION

CROSS-REFERENCE TO RELATED APPLICATIONS

This application is the U.S. National Phase application of PCT Application No. PCT/2015/050275 filed on Jan. 8, 2015, which claims priority to European Patent Application No. 14368011.4 filed on Jan. 13, 2014, the entire contents of each of which are incorporated herein by reference.

The present invention generally relates to mobile communication networks and systems.

Detailed descriptions of mobile communication networks and systems can be found in the literature, such as in particular in Technical Specifications published by standardization bodies such as for example 3GPP ($3^{rd}$ Generation Partnership Project).

An example of a packet mobile communication system is the Evolved Packet System EPS (specified in particular in 3GPP TS 23.401).

An EPS network comprises a Core Network CN called Evolved Packet Core called EPC, that can be accessed by a Radio Access Network RAN called E-UTRAN.

An User Equipment UE can have access to a Packet Data Network PDN (or IP network) via an EPS network providing PDN connectivity (or IP connectivity). Examples of PDN include Internet. Intranet, operator's IP network, . . . etc. Traffic of a PDN connection is handled at bearer level by network nodes (such as E-UTRAN node eNB) in the traffic path between UE and a PDN Gateway PGW.

Connectivity to a PDN is provided via a selected PDN Gateway PGW. The PGW can be located in the EPC. In certain cases, the selected PGW (called Local Gateway LGW) can also be located in the RAN but as a stand-alone node. In other cases, the selected PGW (called Local Gateway LGW) can however be collocated with the E-UTRAN node eNB.

For example, a Local Gateway LGW is selected for LIPA (Local IP Access). This functionality is specified in particular in 3GPP TS 23.401, section 4.3.16. This functionality enables an IP capable UE connected via a HeNB to access other IP capable entities in the same residential/enterprise IP network without the user plane traversing the mobile operator's network except HeNB subsystem.

Support of HeNB and HeNB subsystem are specified in particular in 3GPP 30 TS 23.401 and 3GPP TS 36.300. HeNB is a Customer-premises equipment that connects a 3GPP UE over E-UTRAN wireless interface to a mobile operator's network using a broadband IP backhaul.

In another example, a Local Gateway LGW is selected for SIPTO (Selected IP Traffic Offload) at the Local Network with L-GW function collocated with the (H)eNB. This functionality is specified in particular in 3GPP TS 23.401, section 4.3.15a.3. This functionality enables an IP capable UE connected via a (H)eNB to access a defined IP network (e.g. the Internet) without the user plane traversing the mobile operator's network.

Functionalities such as LIPA and SIPTO at the Local Network with L-GW function collocated with the (H)eNB thus bring benefits to users and/or network operators. It has to be noted that a L-GW supports PGW functions but may not support all PGW functions.

There may be similar concepts in systems other than EPS (taken above as an example), for example in 3GPP UTRAN and in non-3GPP based systems.

Small Cell enhancements are now in the process of being standardized, in particular by 3GPP. Small Cell enhancements include in particular a dual connectivity feature, defined (in particular in 3GPP TR 36.842) as an operation where a given UE consumes radio resources provided by at least two different network points (Master and Secondary eNBs) connected with non-ideal backhaul, while in RRC_Connected state.

As recognized by the inventors and as will be described with more details later, there is a need to improve such dual connectivity feature, in particular for LIPA or SIPTO at the Local Network with L-GW function collocated with the (H)eNB, otherwise quality of service may be degraded in a non acceptable way, e.g. at offload of a bearer from a Master eNB to a Secondary eNB.

Embodiments of the present invention in particular address such needs.

These and other objects are achieved, in one aspect, by a method for bearer offload from a RAN node referred to as Master RAN node such as Master eNB (MeNB) for E-UTRAN, to a RAN node referred to as Secondary RAN node such as Secondary eNB (SeNB) for E-UTRAN, in dual connectivity operation, wherein before said offload said bearer is or had been handled by said Master RAN node and involves a Local Gateway LGW collocated with said Master RAN node, said method including:

providing that after said offload said bearer is handled by said Secondary RAN node and involves said Local Gateway LGW collocated with said Master RAN node.

These and other objects are achieved, in other aspects, by entities for performing such method and/or individual step(s) of such method, said entities including, in particular (though not exclusively): RAN node such as eNB for E-UTRAN, and Local Gateway LGW supporting a local PGW function (with possibly a reduced set of functionalities with regard to a PGW deployed in the EPC Core).

These and other objects are achieved, in another aspect, by aRAN node referred to as Master RAN node for dual connectivity operation, such as Master eNB (MeNB) for E-UTRAN, adapted to:

signal to a RAN node referred to as Secondary RAN node for said dual connectivity operation, such as Secondary eNB (SeNB) for E-UTRAN, for offload to said Secondary RAN node of a bearer involving a Local Gateway LGW collocated with said Master RAN node, addressing information of said Local Gateway LGW enabling routing of uplink traffic by said Secondary RAN node to said LGW.

These and other objects are achieved, in another aspect, by a RAN node referred to as Secondary RAN node for dual connectivity operation, such as Secondary eNB (SeNB) for E-UTRAN, adapted to:

use addressing information signalled, for offload to said Secondary RAN node of a bearer involving a Local Gateway LGW collocated with said Master RAN node, by a RAN node referred to as Master RAN node for said dual connectivity operation, such as Master eNB (MeNB) for E-UTRAN, said addressing information of said LGW enabling routing of uplink traffic by said Secondary RAN node to said LGW These and other objects are achieved, in another aspect, by a RAN node referred to as Master RAN node for dual connectivity operation, such as Master eNB (MeNB) for E-UTRAN, adapted to:

for offload to a Secondary RAN node for said dual connectivity operation, such as Secondary eNB (SeNB) for E-UTRAN, of a bearer involving or having involved a Local Gateway LGW collocated with said Master RAN node, configure the said Local Gateway LGW, collocated with said Master RAN node, with addressing information of said Secondary RAN node, enabling routing of downlink traffic by said LGW to said Secondary RAN node.

These and other objects are achieved, in another aspect, by a Local Gateway LGW, collocated with a RAN node referred to as Master RAN node for dual connectivity operation, such as Master eNB (MeNB) for E-UTRAN, said LGW adapted to:

use addressing information configured by said Master RAN node, for offload of a bearer involving or having involved said Local Gateway LGW collocated with said Master RAN node, to a Secondary RAN node for said dual connectivity operation, such as Secondary eNB (SeNB) for E-UTRAN, said addressing information of said Secondary RAN node enabling routing of downlink traffic by said Local Gateway LGW to said Secondary RAN node.

Some embodiments of apparatus and/or methods in accordance with embodiments of the present invention are now described, by way of example only, and with reference to the accompanying drawings, in which.

Embodiments of the invention described hereinafter apply more particularly, by way of example, to EPS (4G). However, it should be understood that embodiments of the invention are not so limited, and could also apply e.g. for 3G with HSPA+ where the RNC and the NodeB are collocated or for HNBs, or could also apply to 5G.

3GPP is in the process of standardizing in Release 12 the dual connectivity feature as part of the Work Item Small Cell Enhancements—Higher Layer. This Work Item aims at defining a Dual Connectivity feature where an UE is simultaneously served by 2 ENBs:

A Master ENB (called MENB) that controls at least the signaling connection of the UE A Secondary ENB (Called SENB) that supports at least one of the bearers (data plane) of the UE Two flavors are being discussed for 3GPP standardization, known as alternative 1A and alternative 3C in 3GPP TR 36.842 (TR defining the potential solutions for the Dual Connectivity feature).

Embodiments of the invention focus on Alternative 1A (issues with LIPA/SIPTO at Local Network—Collocated solved by embodiments of the invention apply only to solution 1A). Embodiments o the invention may apply to any Dual Connectivity schema where a bearer of an UE is not handled by the MENB function.

With Alternative 1A, a bearer of an UE is fully controlled by one of the ENB (either by the MENB Exclusive OR by the SENB but not by both at the same time).

This means that the full protocol stack associated with a bearer (GTP-u termination i.e. termination of S1-U, PDCP, RLC, . . . down to the Physical layer) is entirely controlled by one single ENB (either the MENB Exclusive OR the SENB).

Figure 1:
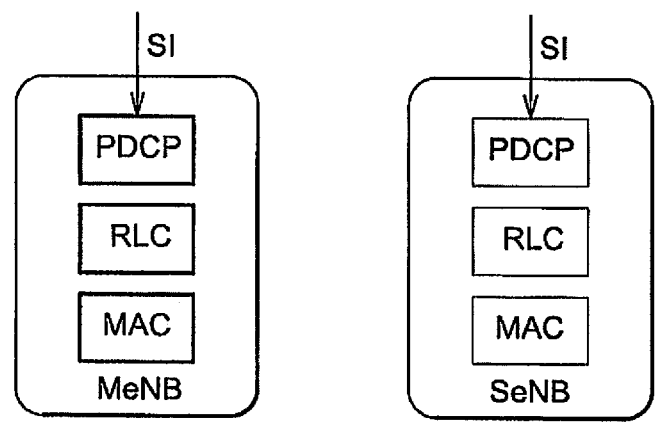
FIG. 1 is intended to recall Alternative 1A architecture.

Alternative 1A is depicted in FIG. 1 (taken from 3GPP TR 36.842), taking the downlink direction as an example (each color: blue/green corresponding to a different bearer).

Figure 2:
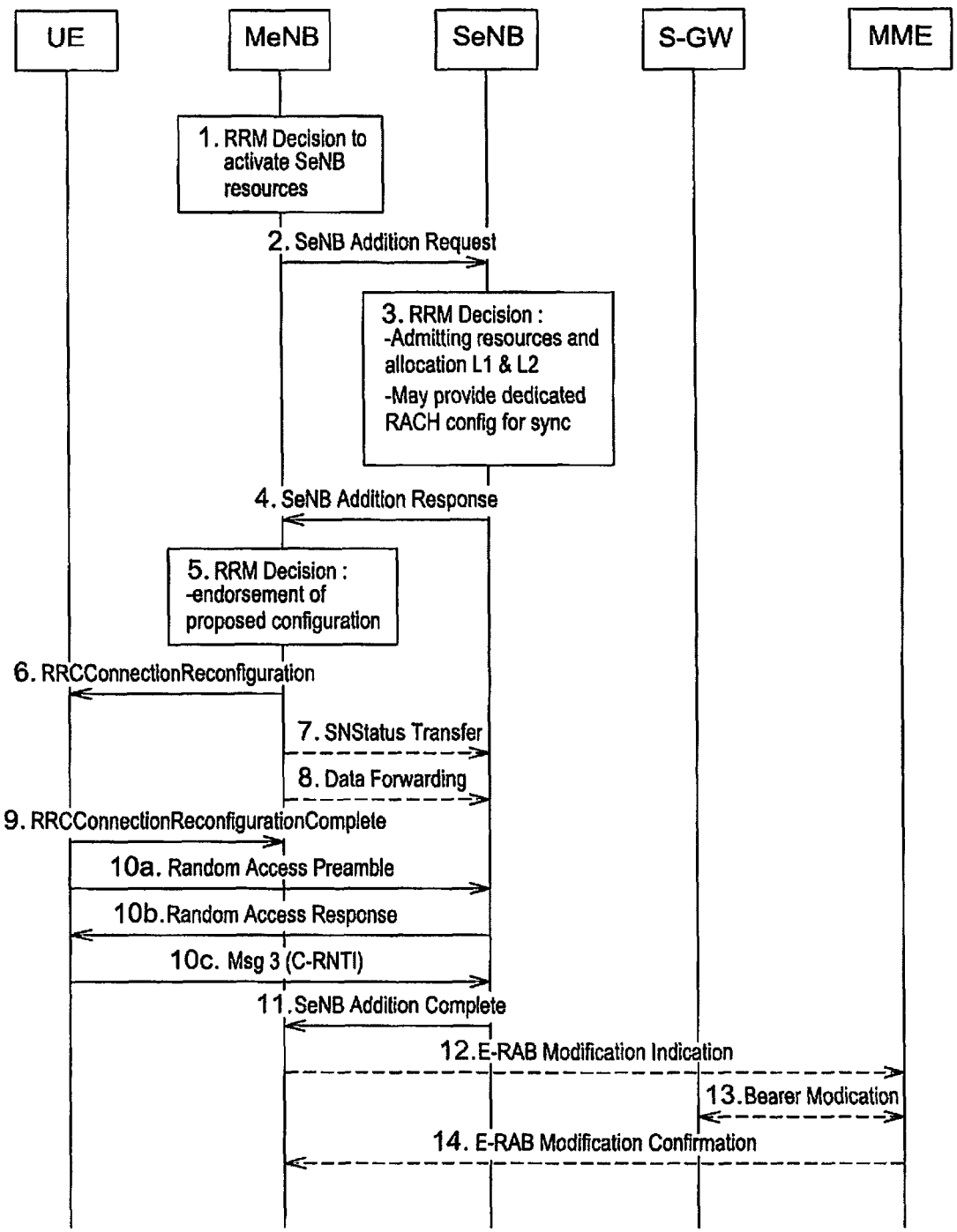
FIG. 2 is intended to recall Alternative 1A call flow.

When alternative 1A is used, a data bearer can be "offloaded" from the master eNB (MeNB) to the Secondary eNB (SeNB), using signaling exchanges between MeNB and SeNB, as shown in FIG. 2 (taken from 3GPP TR 36.842) using X2 interface.

In FIG. 2, steps 1 to 6 correspond to the preparation phase, step 7 to 11, to the execution phase and step 12 to 14 to the update of the Core Network (as the Core Network needs now to send the Downlink flows corresponding to the bearers that have moved to the SENB (and no more to the MENB).

However if this bearer is a bearer that was in LIPA operation, or in SIPTO at local network collocated operation (called SIPTO@LN-C in the following), it is not clear whether that bearer can be offloaded for dual connectivity, whether LIPA/SIPTO@LN-C can continue and how that can be realized efficiently (especially without inducing a change of Local PGW that would imply a loss of the IP address for the UE and thus a service disruption).

Today a bearer in LIPA/SIPTO@LN-C operation must have its PGW function (Local GW) collocated in the RAN node with the data bearer. Therefore when the data bearer is in LIPA/SIPTO@LN-C operation in the MeNB it has its LGW function in the MeNB, and when that data bearer is further offloaded to the SeNB for dual connectivity feature, LGW function and data bearer become in different RAN nodes, hence LGW function needs to be relocated. The mechanism to achieve that is that the network sends a PDN disconnection to the UE which contains a request for the UE to connect again. The same situation applies to SIPTO at local Network-collocated case. This solution induces a lot of messaging with the UE, and temporarily breaks the user plane connectivity.

For uplink direction, embodiments of the invention propose that, when a data bearer is operated in LIPA (respectively in SIPTO at Local Network-collocated), addressing information of the LGW function for the PDN connection (e.g. LGW address with UL TBD or port number corresponding to the PDN connection) in the MeNB is sent by the MeNB to the SeNB when that bearer is offloaded with dual connectivity feature. This information enables the SeNB to route the uplink data related to the PDN connection to the corresponding LGW port in the MeNB.

For downlink direction, the address of the SeNB for the PDN connection (e.g. SeNB address with DL TBD or port number corresponding to the RAN part of the PDN connection) is currently sent by the SeNB to the MeNB when that bearer is offloaded with dual connectivity feature so that the MeNB can indicate it to the EPC within the E-RAB Modification Indication message to enable EPC to switch the DL S1U path, Embodiments of the invention propose that in the case of LIPA bearer (respectively in SIPTO at Local Network-collocated) the LGW in the MeNB can further use this downlink address and DL TEID or port number to route the downlink data related to the PDN connection to the corresponding port in the SeNB.

When this is done, the LIPA operation (respectively the SIPTO at Local Network-collocated) can continue with the LGW function located in MeNB while the data bearer is now handled in the SeNB. Embodiments of the invention require no extra messaging to the UE and to the Core Network for this purpose (while the baseline Dual Connectivity feature requires the MENB to send signaling to the UE as shown in step 6 of FIG. 1). LIPA operation (respectively the SIPTO at Local Network-collocated operation) continues for the data bearer in the SeNB with the associated LGW located in a different node (the MeNB) which is new and extends somehow the concept of LIPA/SIPTO@LN-C for the special case of dual connectivity feature with option 1A of TR 36.842 (as indicated previously, normally LIPA/SIPTO@LN-C is operated with the LGW in same node as the data bearer).

There may be different ways to carry the information between MeNB and SeNB. Two example (called Solution-1 and Solution-2) are described below.

Figure 3:
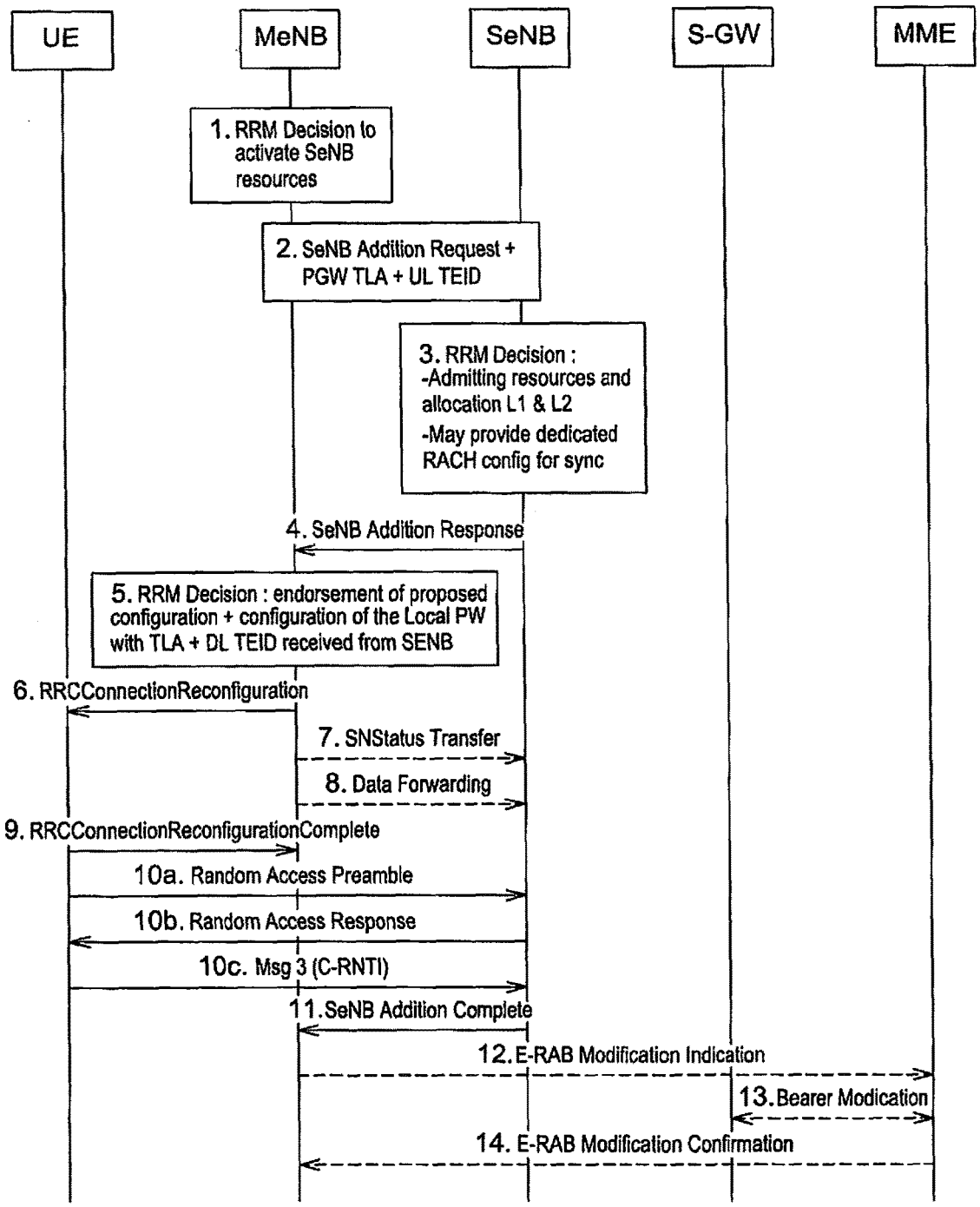
FIG. 3 is intended to illustrate bearer offload according to embodiments of the present invention.

Solution-1 (illustrated in FIG. 3)

In an embodiment, if the MeNB has a LGW function for LIPA operation (respectively SIPTO at local network-collocated) on a bearer to be offloaded at a SENB, it includes the corresponding LGW Transport Layer Address (TLA) IE in the SeNB Addition Request message as well as the uplink TEID that must be used for the LIPA/SIPTO@ LN-C PDN connection.

In an embodiment, when the MeNB receives the SeNB Transport Layer Address (TLA) IE in the SeNB Addition Response message as well as the downlink TEID that must be used by the MeNB to indicate them to the EPC (within the E-RAB Modification Indication) for the downlink S1U path switch, the MeNB can further store and use them to configure the collocated LGW to route the downlink data to SeNB for the LIPA/SIPTO@LN-C PDN connection.

In an embodiment, after the data bearer has been offloaded, the SeNB uses the received uplink TEID and LGW TLA (Transport Layer Address) to send uplink traffic for that bearer via the LGW located in the MeNB, and the LGW collocated with the MeNB uses the received downlink TEID and SeNB TLA to send downlink traffic for that bearer to the SeNB.

Figure 4:
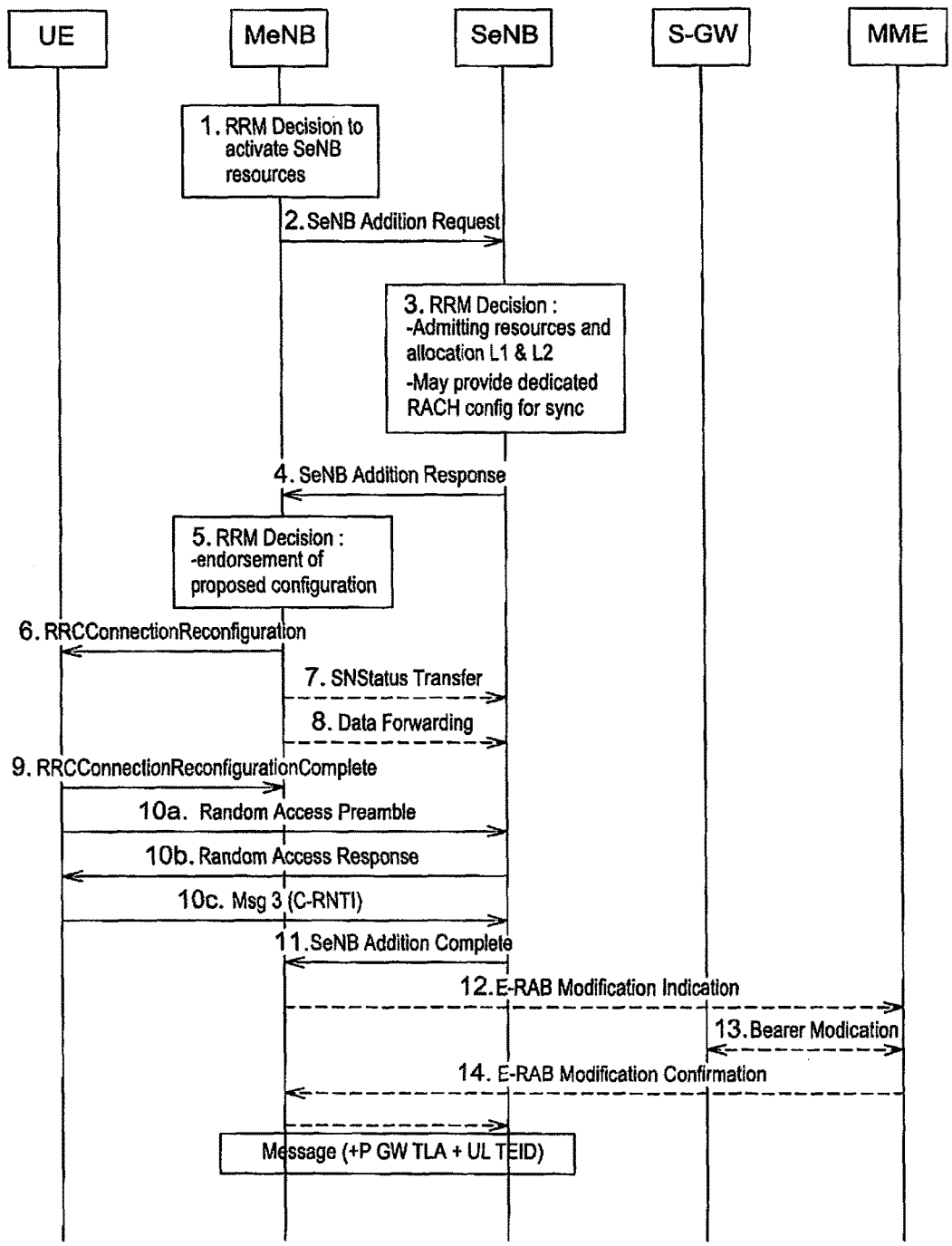
FIG. 4 is intended to illustrate bearer offload according to embodiments of the present invention.

Solution-2 (illustrated in FIG. 4)

In an embodiment, if the MeNB has a LGW function for LIPA operation (or SIPTO at local network-collocated), it includes the corresponding LGW Transport Layer Address IE as well as the uplink TEID that must be used in an X2 message that the MeNB sends to the SeNB after receiving the ERAB Modification Confirmation from the MME.

In an embodiment, this X2 message may be either especially sent for that LIPA/SIPTOL@N-C purpose, or may be sent for another reason and the LIPA/SIPTO@N-C information is piggybacked in it.

In an embodiment, after the data bearer has been offloaded, the SeNB uses the received uplink TEID and LGW TLA to send uplink traffic for that bearer via the LGW located in the MeNB, and the LGW collocated with the MeNB uses the downlink TEI and SeNB TLA received by the MeNB within the SeNB Addition Response message to send downlink traffic for that bearer to the SeNB.

Embodiments of the invention enable to transfer the Gateway addressing information (LGW) associated with a data bearer that is being used for LIPA operation (respectively SI PTO at local network collocated operation, abbreviated into "SIPTO@LN-C") from the MeNB to the SeNB. Thus bearers subject to LIPA/SIPTO@LN-C can be offloaded in dual connectivity with option 1A of 3GPP TR 36.842 from MeNB to the SeNB while continuing the LIPA/SIPTO@LN-C operation with the same LGW located in the MeNB. This extends somehow the concept of LIPA (respectively SIPTO@LN-C) because normally LIPA/SIPTO@LN-C is operated with the LGW located in the same node as the data bearer. With this invention, LIPA/SIPTO@LN-C will continue for the data bearer offloaded into the SeNB with the gateway still residing in the MeNB.

Otherwise (as is currently the case) LIPA/SIPTO@LN-C is interrupted (with the loss of the IP address for the UE and thus service interruption for the end-user) each time such offload takes place (e.g. each time it is felt useful to offload traffic in a small cell). In case UE mobility implies frequent change of small cells to serve an UE, this service interruption may severely degrade the service.

Embodiments of the invention enable that, when the LIPA/SIPTO@N-C bearer is offloaded for dual connectivity from the MeNB to the SeNB, the LIPA/SIPTO@LN-C operation is not "interrupted" by the need to relocate the LGW and associated signalling is saved.

Similar mechanisms can be used when a bearer that used to be offloaded in a first Secondary eNB SeNB1 is now offloaded to a second Secondary eNB SeNB2. From the perspective of the second Secondary eNB SeNB2 and from the perspective of the signaling between this second Secondary eNB SeNB2 and the MeNB, the signaling of the offloading and the node behavior after the offloading is exactly the same than in the case of a simple offloading from a MeNB to SeN Embodiments of the invention may be used for offloading bearer traffic to a small cell while minimizing the impact on LIPA operation or SIPTO at Local Network Collocated operation on that bearer.

In one aspect, there is provided a method for bearer offload from a RAN node referred to as Master RAN node such as Master eNB (MeNB) for E-UTRAN, to a RAN node referred to as Secondary RAN node such as Secondary eNB (SeNB) for E-UTRAN, in dual connectivity operation where the Master eNB (MeNB) does not handle any radio feature for the transport of the said bearer (e.g. according to the option 1A of 3GPP TR 36.842) wherein before said offload said bearer is or had been handled by said Master RAN node and involves a Local Gateway LGW collocated with said Master RAN node, said method including:

providing that after said offload said bearer is handled by said Secondary RAN node and involves said Local Gateway LGW collocated with said Master RAN node.

In other aspects, there are provided entities for performing such method and/or individual step(s) of such method, said entities including, in particular (though not exclusively): RAN node such as ENB for E-UTRAN, and PDN Gateway referred to as Local Gateway LGW.

In another aspect, there is provided a RAN node referred to as Master RAN node for dual connectivity operation where the Master eNB (MeNB) does not handle any radio feature for the transport of the said bearer (e.g. according to the option 1A of 3GPP TR 36.842), such as Master eNB (MeNB) for E-UTRAN, adapted to:

signal to another RAN node referred to as Secondary RAN node for said dual connectivity operation, such as Secondary eNB (SeNB) for E-UTRAN, for offload to said Secondary RAN node of a bearer involving a Local Gateway LGW collocated with said Master RAN node, addressing information of said Local Gateway LGW enabling routing of uplink traffic by said Secondary RAN node to said LGW.

In another aspect there is provided a RAN node referred to as Secondary RAN node for dual connectivity operation where the Master eNB (MeNB) does not handle any radio feature for the transport of the said bearer (e.g. according to the option 1A of 3GPP TR 36.842), such as Secondary eNB (SeNB) for E-UTRAN, adapted to:

use addressing information signalled, for offload to said Secondary RAN node of a bearer involving or having involved a Local Gateway LGW collocated with said Master RAN node, by a RAN node referred to as Master RAN node for said dual connectivity operation, such as Master eNB (MeNB) for E-UTRAN, said addressing information of said Local Gateway enabling routing of uplink traffic by said Secondary RAN node to said LGW.

In another aspect there is provided a RAN node referred to as Master RAN node for dual connectivity operation where the Master eNB (MeNB) does not handle any radio feature for the transport of the said bearer (e.g. according to the option 1A of 3GPP TR 36.842), such as Master eNB (MeNB) for E-UTRAN, adapted to:
  for offload to a Secondary RAN node for said dual connectivity operation, such as Secondary eNB (SeNB) for E-UTRAN, of a bearer involving a Local Gateway LGW collocated with said Master RAN node, configure a Local Gateway LGW, collocated with said Master RAN node, with addressing information of said Secondary RAN node, enabling routing of downlink traffic by said LGW to said Secondary RAN node.

In another aspect, there is provided a Local Gateway LGW, collocated with a RAN node referred to as Master RAN node for dual connectivity operation where the Master eNB (MeNB) does not handle any radio feature for the transport of the said bearer (e.g. according to the option 1A of 3GPP TR 36.842), such as Master eNB (MeNB) for E-UTRAN, said LGW adapted to:
  use addressing information configured by said Master RAN node, for offload of a bearer involving said Local Gateway LGW collocated with said Master RAN node, to a Secondary RAN node for said dual connectivity operation, such as Secondary eNB (SeNB) for E-UTRAN, said addressing information of said Secondary RAN node enabling routing of downlink traffic by said Local Gateway LGW to said Secondary RAN node.

In one aspect, there is provided a RAN node referred to as Master RAN node for dual connectivity operation, such as Master eNB (MeNB) for E-UTRAN, adapted to:
  signal to a RAN node referred to as Secondary RAN node for said dual connectivity operation, such as Secondary eNB (SeNB) for E-UTRAN, for offload to said Secondary RAN node of a bearer involving a Local Gateway LGW collocated with said Master RAN node, addressing information of said Local Gateway LGW enabling routing of uplink traffic by said Secondary RAN node to said LGW.

In another aspect, there is provided a RAN node referred to as Secondary RAN node for dual connectivity operation, such as Secondary eNB (SeNB) for E-UTRAN, adapted to:
  use addressing information signalled, for offload to said Secondary RAN node of a bearer involving a Local Gateway LGW collocated with said Master RAN node, by a RAN node referred to as Master RAN node for said dual connectivity operation, such as Master eNB (MeNB) for E-UTRAN, said addressing information of said LGW enabling routing of uplink traffic by said Secondary RAN node to said LGW.

In an embodiment,
said addressing information includes LGW Transport Layer Address and uplink TEID or port number of the PDN connection.

In an embodiment,
said signalling is contained in a message sent on an interface between said Master RAN node and said Secondary RAN node involved in said dual connectivity operation.

In an embodiment,
said signalling is contained in a SeNB Addition Request message sent by said MeNB to said SeNB over an interface such as X2 interface.

In an embodiment,
said signalling is contained in a X2 message sent by said MeNB to said SeNB after reception by said MeNB of an S1 message E-RAB Modification Confirmation.

In another aspect, there is provided a RAN node referred to as Master RAN node for dual connectivity operation, such as Master eNB (MeNB) for E-UTRAN, adapted to:
  for offload to a Secondary RAN node for said dual connectivity operation, such as Secondary eNB (SeNB) for E-UTRAN, of a bearer involving a Local Gateway LGW collocated with said Master RAN node, configure the said Local Gateway LGW, collocated with said Master RAN node, with addressing information of said Secondary RAN node, enabling routing of downlink traffic by said LGW to said Secondary RAN node.

In an embodiment, said RAN node is adapted to:
perform said configuration, upon reception of said addressing information signalled by said Secondary RAN node to said Master RAN node.

In an embodiment, said RAN node is adapted to:
said addressing information includes Secondary RAN Transport Layer Address and RAN downlink TEID or port number for the PDN connection.

In an embodiment,
the addressing information is contained in a SeNB Addition Response message sent by said SeNB to said MeNB over an interface such as X2 interface In an embodiment,
said bearer includes a bearer in LIPA operation or a bearer in SIPTO at local network collocated operation.

In another aspect, there is provided a Local Gateway LGW, collocated with a RAN node referred to as Master RAN node for dual connectivity operation, such as Master eNB (MeNB) for E-UTRAN, said LGW adapted to:
  use addressing information configured by said Master RAN node, for offload of a bearer involving said Local Gateway LGW collocated with said Master RAN node, to a Secondary RAN node for said dual connectivity operation, such as
Secondary eNB (SeNB) for E-UTRAN, said addressing information of said Secondary RAN node enabling routing of downlink traffic by said Local Gateway LGW to said Secondary RAN node.

In an embodiment,
said addressing information includes Secondary RAN Transport Layer
Address and RAN downlink TEID or port number for the PDN connection.

In an embodiment,
said bearer includes a bearer in LIPA operation or a bearer in SIPTO at local network collocated operation.

In another aspect, there is provided a method for bearer offload from a RAN node referred to as Master RAN node such as Master eNB (MeNB) for E-UTRAN, to a RAN node referred to as Secondary RAN node such as Secondary eNB (SeNB) for E-UTRAN, in dual connectivity operation, wherein before said offload said bearer is or had been handled by said Master RAN node and involves a Local Gateway LGW collocated with said Master RAN node, said method including:
  providing that after said offload said bearer is handled by said Secondary RAN node and involves said Local Gateway LGW collocated with said Master RAN node.

In an embodiment, said method includes:

said Master RAN node signalling to said Secondary RAN node, addressing information of said Local Gateway LGW for the routing of uplink traffic by said Secondary RAN node to said LGW.

In an embodiment, said method includes:

said Secondary RAN node using addressing information of said Local Gateway signalled by said Master RAN node, for routing uplink traffic to said Local Gateway LGW.

In an embodiment, said method includes:

said Master RAN node configuring said LGW with addressing information of said Secondary RAN node, enabling routing of downlink traffic by said LGW to said Secondary RAN node.

In an embodiment, said method includes:

said LGW using addressing information configured by said Master RAN node, for routing downlink traffic to said Secondary RAN node.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods,

The invention claimed is:

1. An apparatus comprising:
a memory storing computer-readable instructions; and
a processor configured to execute the computer-readable instructions to cause said apparatus to,
   act as a master radio access network node for dual connectivity operation, and
   signal addressing information to a secondary radio access network node for said dual connectivity operation, for offload to said secondary radio access network node of a bearer involving local gateway collocated with said master radio access network node, wherein said addressing information includes (i) transport layer address of said local gateway, and (ii) an uplink tunnel endpoint identifier or port number at said local gateway, said addressing information enabling said secondary radio access network node to send uplink traffic associated with said bearer to said local gateway.

2. An apparatus comprising:
a memory storing computer-readable instructions; and
a processor configured to execute the computer-readable instructions to cause said apparatus to,
   act as a secondary radio access network node for dual connectivity operation,
   receive addressing information signalled by a master radio access network node for said dual connectivity operation, for offload to said secondary radio access network node of a bearer involving a local gateway collocated with said master radio access network node, wherein said addressing information includes (i) transport layer address of said local gateway, and (ii) an uplink tunnel endpoint identifier or port number at said local gateway, and
   use said addressing information to send uplink traffic associated with said bearer to said local gateway.

3. The apparatus according to claim 1, wherein said addressing information is contained in a message sent on an interface between said master radio access network node and said secondary radio access network node involved in said dual connectivity operation.

4. The apparatus according to claim 1, wherein
said master radio access network node comprises a master eNodeB,
said secondary radio access network node comprises a secondary eNodeB, and
said addressing information is contained in a secondary eNodeB addition request message sent by said master eNodeB to said secondary eNodeB over an X2 interface.

5. The apparatus according to claim 1, wherein
said master radio access network node comprises a master eNodeB,
said secondary radio access network node comprises a secondary eNodeB, and
said addressing information is contained in an X2 message sent by said master eNodeB to said secondary eNodeB after reception by said master eNodeB of an S1 message radio access bearer modification confirmation.

6. An apparatus comprising:
a memory storing computer-readable instructions; and
a processor configured to execute the computer-readable instructions to cause said apparatus to,
   act as a master radio access network node for dual connectivity operation,
   receive addressing information from a secondary radio access network node for said dual connectivity operation, wherein said addressing information includes (i) a transport layer address of the secondary radio access network node, and (ii) a downlink tunnel endpoint identifier or port number at said secondary radio access network node, and
   configure a local gateway collocated with said master radio access network node, for offload of a bearer involving said local gateway to said secondary radio access network node for said dual connectivity operation, with said addressing information, said addressing information enabling said local gateway to send downlink traffic associated with said bearer to said secondary radio access network node.

7. The apparatus according to claim 6, wherein said processor is configured to execute the computer-readable instructions to cause said apparatus to configure said local gateway with said addressing information of said secondary radio access network node upon reception of said addressing information signalled by said secondary radio access network node to said master radio access network node.

8. The apparatus according to claim 6, wherein
said master radio access network node comprises a master eNodeB,
said secondary radio access network node comprises a secondary eNodeB, and
said addressing information is contained in a secondary eNodeB addition response message sent by said secondary eNodeB to said master eNodeB over an X2 interface.

9. The apparatus according to claim 1, wherein said bearer includes:
a bearer in local internet protocol access operation, or
a bearer in selected internet protocol traffic offload at local network collocated operation.

10. An apparatus comprising:
a memory storing computer-readable instructions; and
a processor configured to execute the computer-readable instructions to cause said apparatus to,
act as a local gateway collocated with a master radio access network node for dual connectivity operation,
receive addressing information configured by said master radio access network node, for offload of a bearer involving said local gateway to a secondary radio access network node for said dual connectivity operation, wherein said addressing information includes (i) a transport layer address of said secondary radio access network node, and (ii) a downlink tunnel endpoint identifier or port number at said secondary radio access network node, and
use said addressing information to send downlink traffic associated with said bearer to said secondary radio access network node.

11. The apparatus according to claim 10, wherein said bearer includes:
a bearer in local internet protocol access operation, or
a bearer in selected internet protocol traffic offload at local network collocated operation.

12. The apparatus according to claim 2, wherein said addressing information is contained in a message sent on an interface between said master radio access network node and said secondary radio access network node involved in said dual connectivity operation.

13. The apparatus according to claim 2, wherein
said master radio access network node comprises a master eNodeB,
said secondary radio access network node comprises a secondary eNodeB, and
said addressing information is contained in a secondary eNodeB addition request message sent by said master eNodeB to said secondary eNodeB over an X2 interface.

14. The apparatus according to claim 2, wherein said bearer includes:
a bearer in local internet protocol access operation, or
a bearer in selected internet protocol traffic offload at local network collocated operation.

15. The apparatus according to claim 6, wherein said bearer includes:
a bearer in local internet protocol access operation, or
a bearer in selected internet protocol traffic offload at local network collocated operation.

16. A method comprising:
acting as a master radio access network node for dual connectivity operation; and
signaling addressing information to a secondary radio access network node for said dual connectivity operation, for offload to said secondary radio access network node of a bearer involving a local gateway collocated with said master radio access network node, wherein said addressing information includes (i) a transport layer address of said local gateway, and (ii) an uplink tunnel endpoint identifier or port number at said local gateway, said addressing information enabling said secondary radio access network node to send uplink traffic associated with said bearer to said local gateway.

17. A method comprising:
acting as a secondary radio access network node for dual connectivity operation;
receiving addressing information signaled by a master radio access network node for said dual connectivity operation, for offload to said secondary radio access network node of a bearer involving a local gateway collocated with said master radio access network node, wherein said addressing information includes (i) a transport layer address of said local gateway, and (ii) an uplink tunnel endpoint identifier or port number at said local gateway; and
using said addressing information to send uplink traffic associated with said bearer to said local gateway.

18. A method comprising:
acting as a master radio access network node for dual connectivity operation;
receiving addressing information from a secondary radio access network node for said dual connectivity operation, wherein said addressing information includes (i) a transport layer address of the secondary radio access network node, and (ii) a downlink tunnel endpoint identifier or port number at said secondary radio access network node; and
configuring a local gateway collocated with said master radio access network node, for offload of a bearer involving said local gateway to said secondary radio access network node for said dual connectivity operation, with said addressing information, said addressing information enabling said local gateway to send downlink traffic associated with said bearer to said secondary radio access network node.

19. A method comprising:
acting as a local gateway collocated with a master radio access network node for dual connectivity operation;
receiving addressing information configured by said master radio access network node, for offload of a bearer involving said local gateway to a secondary radio access network node for said dual connectivity operation, wherein said addressing information includes (i) a transport layer address of said secondary radio access network node, and (ii) a downlink tunnel endpoint identifier or port number at said secondary radio access network node; and
using said addressing information to send downlink traffic associated with said bearer to said secondary radio access network node.

* * * * *